(12) United States Patent
Todoroki et al.

(10) Patent No.: US 7,877,753 B2
(45) Date of Patent: Jan. 25, 2011

(54) MULTI-PROCESSOR SYSTEM AND PROGRAM FOR CAUSING COMPUTER TO EXECUTE CONTROLLING METHOD OF INTERRUPTION OF MULTI-PROCESSOR SYSTEM

(75) Inventors: Akinari Todoroki, Okaya (JP); Katsuya Tanaka, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 1051 days.

(21) Appl. No.: 11/651,451

(22) Filed: Jan. 10, 2007

(65) Prior Publication Data

US 2007/0168592 A1 Jul. 19, 2007

(30) Foreign Application Priority Data

Jan. 16, 2006 (JP) .............................. 2006-007301

(51) Int. Cl.
  *G06F 9/46* (2006.01)
(52) U.S. Cl. .................. 718/103; 718/104; 710/260; 710/262; 712/244
(58) Field of Classification Search ................ 718/104, 718/103; 710/260, 262; 712/244
  See application file for complete search history.

(56) References Cited

U.S. PATENT DOCUMENTS

| 6,874,049 | B1 * | 3/2005 | Wyland ........................ 710/260 |
| 7,472,214 | B2 * | 12/2008 | Nankaku et al. ............ 710/264 |
| 2003/0041173 | A1 | 2/2003 | Hoyle | |
| 2003/0221071 | A1 | 11/2003 | McKenney et al. | |
| 2005/0155034 | A1 * | 7/2005 | Jiang et al. .................. 718/106 |
| 2006/0136640 | A1 * | 6/2006 | Tuan ........................... 710/260 |

FOREIGN PATENT DOCUMENTS

| JP | A 3-6654 | 1/1991 |
| JP | A 6-4323 | 1/1994 |
| JP | A 8-297581 | 11/1996 |
| KR | 1019990053528 A | 7/1999 |

OTHER PUBLICATIONS

Robert Love, "Kernel Synchronization Methods," Linux Kernel Development (Chapter 9), Jan. 12, 2005, pp. 131-156, Novell Press.
Thomas E. Anderson, "The Performance of Spin Lock Alternatives for Shared-Memory Multiprocessors," IEEE Transactions on Parallel and Distributed Systems, Jan. 1, 1990, pp. 6-16, vol. 1, No. 1, IEEE Service Center, Los Alamitos, CA.
European Patent Office, *European Search Report for Application No. 07706857.5*, Jan. 28, 2010, pp. 1-7.

* cited by examiner

*Primary Examiner*—Andy Ho
(74) *Attorney, Agent, or Firm*—Oliff & Berridge, PLC (57) ABSTRACT

A multi-processor system with a plurality of unit processors includes: a semaphore setting section for setting semaphores representing preferential right to the competing of resources to be able to be identified to correspond to each of a plurality of the resources; a semaphore request determining section for determining, whether when a first unit processor among said unit processors requests to obtain a semaphore that is set to said semaphore setting section, the request is for requesting a semaphore being obtained by the second unit processor; and an exclusive controlling section for making the request by the first unit processor wait when it is determined that said request is for requesting a semaphore being obtained, and permitting to obtain the requested semaphore when it is determined that said request is for requesting a semaphore other than the semaphore being obtained by the semaphore request determining section.

5 Claims, 10 Drawing Sheets

MULTI-PROCESSOR SYSTEM AND PROGRAM FOR CAUSING COMPUTER TO EXECUTE CONTROLLING METHOD OF INTERRUPTION OF MULTI-PROCESSOR SYSTEM

The entire disclosure of Japanese Patent Application No. 2006-007301, filed Jan. 16, 2006 is expressly incorporated by reference herein.

BACKGROUND

1. Technical Field

The present invention relates to a multi-processor system and a program for causing a computer to execute a controlling method of an interruption of the multi-processor system, and specifically to a multi-processor system that processes programs in parallel while accepting interruption processing from external devices and a program for causing a computer to execute a controlling method of an interruption of the multi-processor system.

2. Related Art

The processor used for a specific device is called a built-in system. Recently, a multi-processor or a multi-thread processor is used for a built-in system. The multi-processor is advantageously used to make the device have fewer clocks or improve the responsiveness of the device. It is desirable to use a multi-processor in a portable device in particular, as the multi-processor is also advantageous in reducing power consumption.

The determination of whether a newly developed processor operates normally or not takes time and cost. For that reason, in the field of software, if a processor that has been used and proved its good performance can be diverted, it is desirably diverted. When the built-in system is used as a multi-processor, it is requested to divert software of a previously used single processor.

A conventional technique for diverting a single processor for a multi-processor is described in JP-A-8-297581 (hereinafter referred to as patent document 1), for example. The invention of the patent document 1 is for transporting an OS (Operating System) for a single processor based on μITRON (registered trademark) to a multi-processor.

In a single processor, however, a processor is set to interruption prohibition at a task side, while a processor executes a program by a predetermined unit (task). In the single processor, an interruption during execution of processing may be prohibited in an interruption whose interruption level is relatively low. In the single processor, when a service call for calling an OS is issued, an interruption needs to be prohibited during the entire period from issuing a service call to releasing an OS.

If the above mentioned specification is diverted for a multi-processor, the multi-processor cannot execute an interruption and task processing in parallel even when the multi-processor has a plurality of processor units. As a time period in which an interruption enters into a waiting state occurs whatever its priority is, there is a problem in that efficiency of a program decreases.

Figure 11:
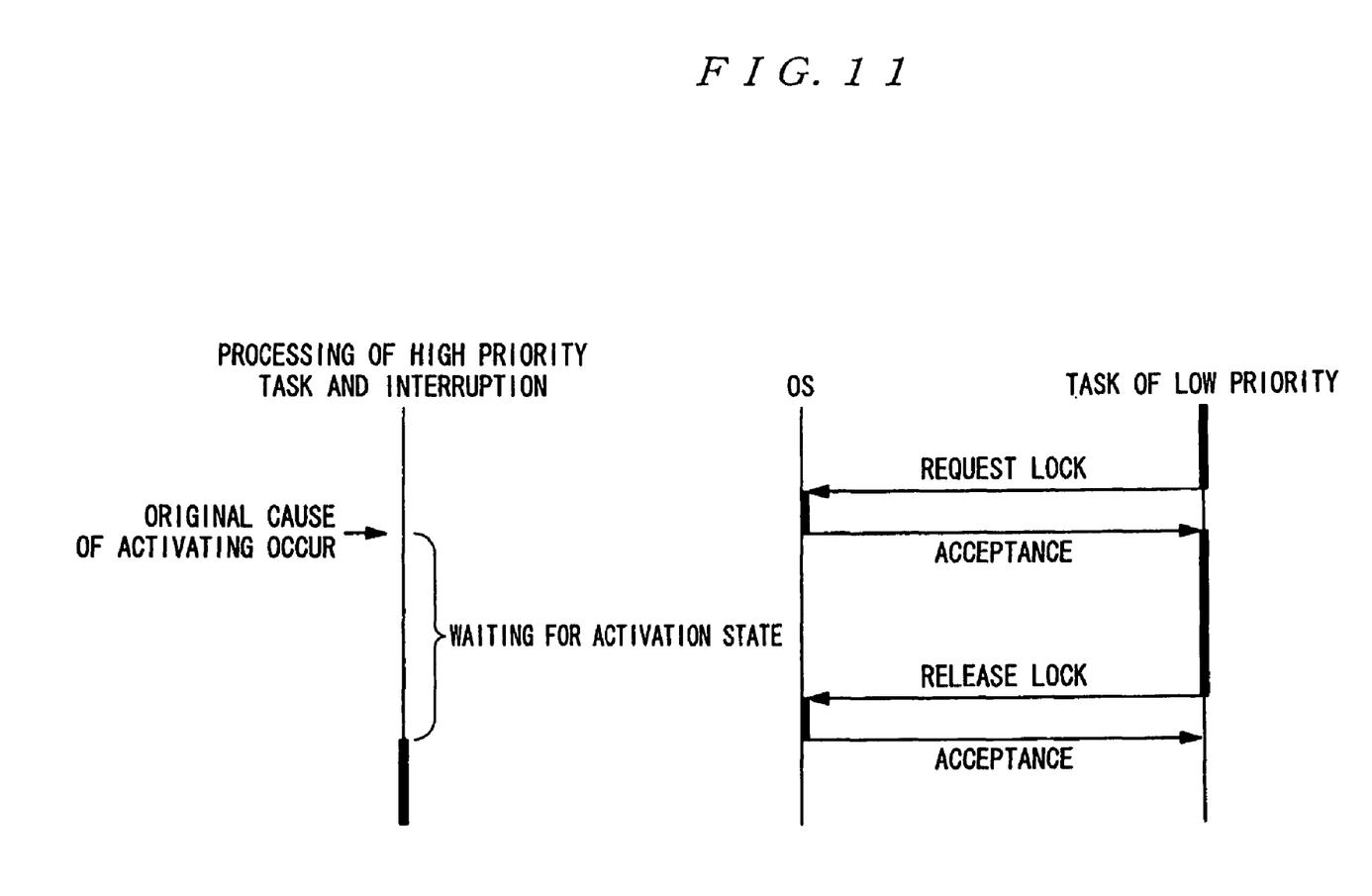
FIG. 11 is a diagram illustrating a conventional technique in which an interruption enters in a waiting state.

FIG. 11 is diagram illustrating a conventional technique in which an interruption enters in a waiting state. The task sets interruption prohibition to the processor to prevent itself from being interrupted by a task with a higher priority or an interruption during the task with a low priority. As a result, the following task or interruption is kept waiting until the task with lower priority ends without being activated.

The present invention is adapted in view of the problems and intends to provide a multi-processor system that enables parallel processing of a task and an interruption in a multi-processor system and shortens a waiting time of a task or the like for higher efficiency of parallel processing and a program for causing a computer to execute a controlling method of an interruption of the multi-processor system.

SUMMARY

In order to solve the abovementioned problem, the multi-processor system of the present invention is a multi-processor system with a plurality of unit processors, characterized by including a semaphore setting section for setting semaphores representing preferential right to the competing of resources to be able to be identified to correspond to each of a plurality of the resources; a semaphore request determining section for determining whether, when a first unit processor among the unit processors requests to obtain a semaphore that is set to the semaphore setting section, the request is for requesting a semaphore being obtained by the second unit processor, and an exclusive controlling section for making the request by the first unit processor wait when it is determined that the request is for requesting a semaphore being obtained, and permitting to obtain the requested semaphore when it is determined that the request is for requesting a semaphore other than the semaphore being obtained by the semaphore request determining section.

According to the invention, a plurality of semaphores can be set to be able to be identified to correspond to resources. When a first unit processor among the unit processor requests to obtain a semaphore set in the semaphore setting section, the invention determines whether the request is for requesting a semaphore being obtained by the second unit processor by identifying the semaphore, which is a semaphore being obtained by the second unit processor. If the request is determined as for requesting a semaphore being obtained, are quest of the first unit processor is made waiting. If a request is determined as for requesting a semaphore other than the semaphore being obtained, the requested semaphore is permitted to be obtained.

For this reason, the first unit processor never enters into a waiting state except for the case where the requested semaphore has been obtained so that the first unit processor can operate in parallel with a second unit processor.

The present invention can shorten a time period during which a unit processor is in the waiting state and increase a time period in which a unit processor can operate in parallel. The present invention can provide a multi-processor system with high efficiency for parallel processing.

The multi-processor system of the present invention is characterized by including an interruption prohibiting section for prohibiting at least one of a task switch by dispatch for a first unit processor that is permitted to obtain a semaphore, an interruption requested from outside and an interruption requested by another unit processor.

According to the invention, likelihood that deadlock or the like occurs can be reduced without an interruption occurring in the first unit processor until the end of the processing.

The multi-processor system of the present invention is characterized in that a unit processor requests to obtain a semaphore to process a task that occurs inside the multi-processor and a handler that occurs outside the multi-processor, and the exclusive controlling section causes to wait or permits to obtain a semaphore between semaphore obtaining requests for processing tasks, between a semaphore obtaining request for processing a task and a semaphore obtaining request for processing a handler, and between semaphore obtaining requests for processing handlers.

According to the invention, task processing, task processing and hander processing, and handler processing can be processed in parallel.

The multi-processor system of the present invention is characterized by spinning lock the first unit processor when the exclusive controlling means permits to obtain the semaphore requested by the first unit processor.

According to the invention, another unit processor in a waiting state can periodically detect releasing of a semaphore by the first unit processor. For this reason, the present invention can obtain a semaphore that is released by immediately detecting releasing of a semaphore by the first unit processor so that the unit processor can exit from the waiting state.

The multi-processor system of the present invention is characterized in that the semaphore setting section sets each of a plurality of semaphores to be able to be identified by adding identification information to each of the plurality of semaphores and sets a managing area for each of the plurality of semaphores added with common identification information by adding the common identification information to at least some semaphores of the plurality of semaphores, and the semaphore request determining section determines whether a semaphore that is requested by the first unit processor to obtain is a semaphore being obtained by the second unit processor or not for each managing area according to the identification information.

According to the invention, many semaphores can be controlled even with a few hardware resources.

A program for causing a computer to execute a controlling method of an interruption of the multi-processor system of the present invention is a program for causing a computer to execute a controlling method of an interruption of the multi-processor system to be applied to the multi-processor system with a plurality of unit processors, characterized by including a semaphore request determining step of determining whether, when a first unit processor among the unit processors requests to obtain a semaphore that is set to be able to be identified, the request is for requesting a semaphore being obtained by the second unit processor; an exclusive controlling step of making the request from the first unit processor wait when it is determined that the request is for requesting a semaphore being requested, and permitting to obtain a requested semaphore when it is determined that the request is for requesting a semaphore other than the semaphore being obtained at the semaphore request determining step; and an interruption prohibition step of setting interruption prohibition to the unit processor for which a semaphore is permitted to be obtained at the exclusive controlling step.

According to the invention, when the first unit processor among the unit processors requests to obtain a semaphore that is set to be able to be identified, it is determined whether the request is for requesting a semaphore being obtained by the second unit processor by identifying the semaphore. If the request is determined as for requesting a semaphore being obtained, a request of the first unit processor is made waiting. If a request is determined as for requesting a semaphore other than the semaphore being obtained, the requested semaphore is permitted to be obtained.

For this reason, the first unit processor never enters into a waiting state except for the case where the requested semaphore has been obtained so that the first unit processor can operate in parallel with a second unit processor.

The present invention can shorten a time period during which a unit processor is in the waiting state and increase a time period in which a unit processor can operate in parallel.

The present invention can provide a program for causing a computer to execute a controlling method of an interruption of a multi-processor system with high efficiency for parallel processing.

DETAILED DESCRIPTION OF THE PREFERRED EMBODIMENTS

An embodiment of the multi-processor system according to the present invention and a program for causing a computer to execute the controlling method of an interruption of the multi-processor system will be described.

Figure 1A:
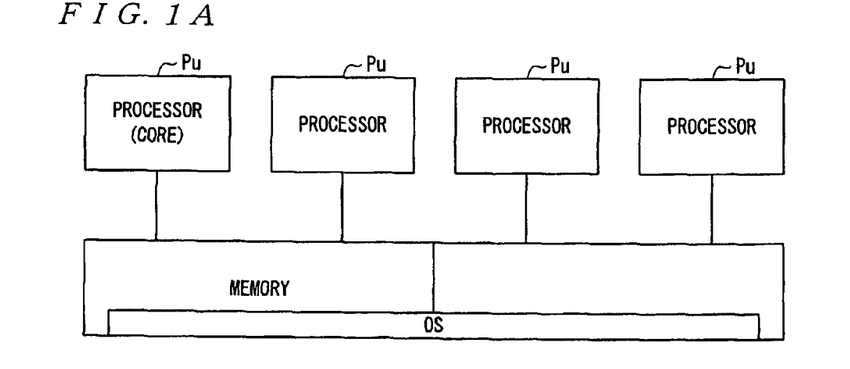
FIGS. 1A and 1B are diagrams showing an example of combining unit processors in a general multi-processor system.
Figure 1B:
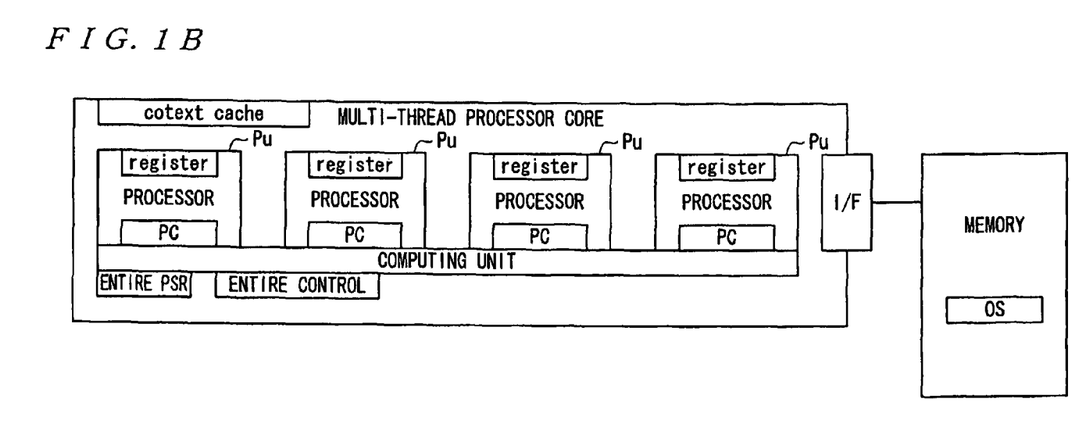

In the embodiment, the multi-processor system is adapted to be applied as built-in system applied to a cellular phone. The multi-processor system is formed with a plurality of processors (unit processors) coupled with each other. FIGS. 1A and 1B show examples of combing unit processors in a general multi-processor system.

Each of the multi-processors shown in FIGS. 1A and 1B is a configuration called a symmetric multi-processor (SMP) where a plurality of unit processors Pu are coupled so as to share a memory. The configuration shown in FIG. 1A is a configuration called a multi-processor, while the configuration shown in FIG. 1B is called a multi-thread processor. In the multi-thread processor, unit processors Pu are more closely combined with each other than in the multi-processor in that a computing unit is shared.

In the embodiment, an example where a multi-processor system is adapted as a multi-processor will be described. The embodiment can be adapted as a multi-processor or a multi-thread processor.

Figure 2:
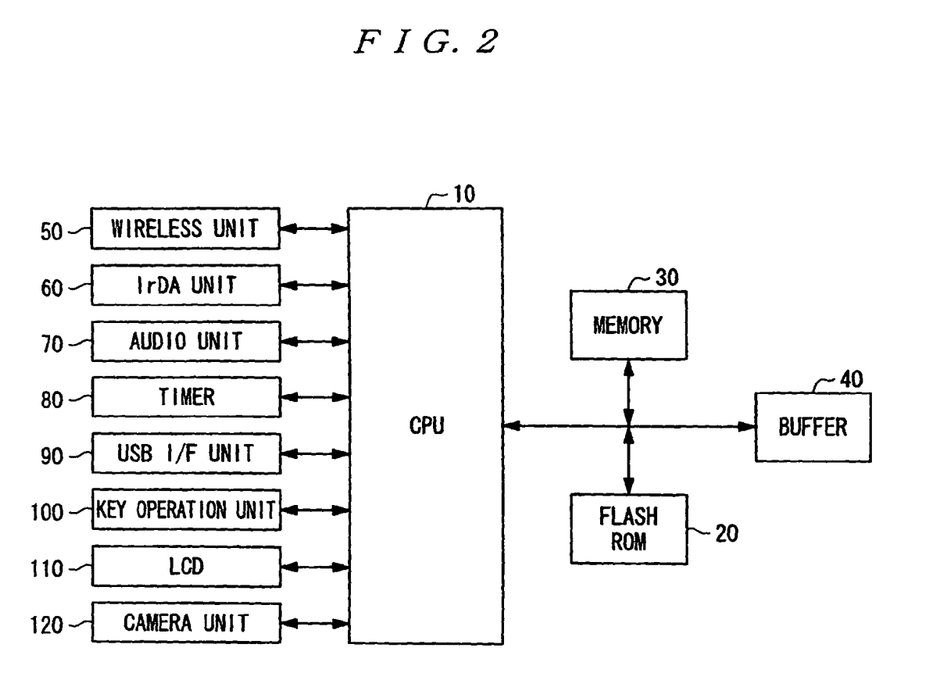
FIG. 2 is a block diagram showing a functional configuration of a cellular phone to which a multi-processor system of an embodiment of the present invention is applied.

FIG. 2 is a block diagram showing a functional configuration of a cellular phone 1 to which a multi-processor system of an embodiment of the present invention is applied. In FIG. 2, the cellular phone 1 includes a CPU (Central Processing Unit)

10, a flash ROM 20, a memory 30, a buffer 40, a wireless unit 50, an IrDA (Infrared Data Association) unit 60, an audio unit 70, a timer 80, a USB (Universal Serial Bus) interface unit 90, a key operation unit 100, an LCD (Liquid Crystal Display) 110, and a camera unit 120 with the CPU 10, the flash ROM 20, the memory 30 and the buffer 40 connected via a bus. The wireless unit 50, the IrDA unit 60, the audio unit 70, the timer 80, the USB interface unit 90, the key operation unit 100, the LCD 110 and the camera unit 120 are directly connected with the CPU 10.

The CPU 10 is for controlling over the cellular phone 1 by processing a plurality of tasks in parallel. In response to various indicating signals inputted from the key operation unit 100, the CPU 10 reads and executes an operating system (OS) program or various application programs stored in the memory 30, and executes an interruption handler according to an interruption signals inputted from peripheral chips such as the wireless unit 50, the audio unit 70 or the camera unit 120. The OS corresponds to the multi-processor.

The CPU 10 stores various processing results in the flash ROM 20 or the memory 30.

Figure 3:
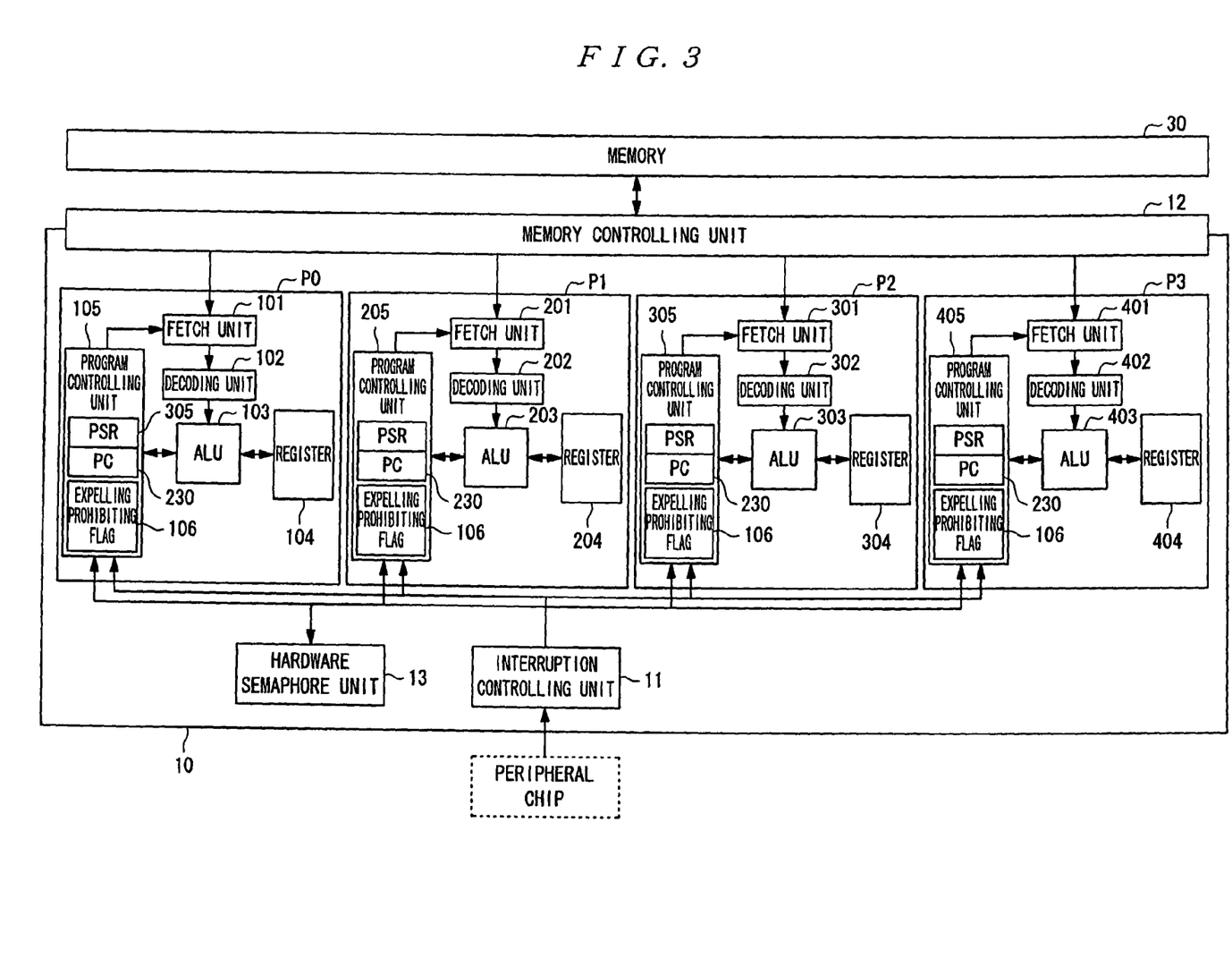
FIG. 3 is a diagram illustrating a multi-processor of the embodiment of the present invention.

FIG. 3 is a diagram illustrating a multi-processor of the embodiment shown in FIG. 2 as the CPU 10. The multi-processor of the embodiment combines a plurality of unit processors P0, P1, P2, and P3 and operates the unit processors in the plurality of operating systems. As shown in FIG. 3, the multi-processor includes a plurality of unit processors P0 to P3, an interruption controlling section 11, the memory-controlling section 12, and a hardware semaphore (hereinafter HW semaphore) section 13.

The HW semaphore 13 is adapted to set an HW semaphore that is a right for any of the unit processors to preferentially execute competing processing (in the embodiment, processing occupying a hardware resource). In the embodiment, a plurality of HW semaphores according to the hardware resource are set to be able to be identified to the HW semaphore unit 13. Identification information (ID) is added to each of the plurality of HW semaphores for identification. Service call for requesting an HW semaphore is performed by specifying ID of the HW semaphore.

Only a unit processor that can obtain the HW semaphore with a service call can execute processing by using a hardware resource corresponding to the HW semaphore. In the embodiment, an interruption for the unit processor that can obtain the HW semaphore is prohibited for a necessary period of time.

When a first unit processor (for example, a unit processor P0) among the unit processors issues a request to obtain a semaphore that is set to the HW semaphore unit 13 in association with a program controlling unit 105 to be described later, the HW semaphore unit 13 determines whether the request is for requesting a semaphore (semaphore being obtained) that is being obtained by a second unit processor (for example, a unit processor P1) or not.

If the HW semaphore unit 13 determines that a request to obtain a semaphore requests a semaphore being obtained, the program controlling unit 105 causes a request from the unit processor P0 to wait. On the other hand, if the request is determined to request a semaphore other than the semaphore being obtained, the program controlling unit 105 permits to obtain the requested semaphore. It sets the unit processor P0 unit processor that is permitted to obtain a semaphore to an interrupt disabled.

With the above mentioned configuration, the HW semaphore unit 13 corresponds to a semaphore setting section, and the HW semaphore unit 13 and the program controlling unit 105 correspond to a semaphore request determination section, an exclusive-controlling section, and an interruption controlling section.

The program-managing unit 105 determines whether the requested HW semaphore has been used by the other unit semaphore or not in response to the ID for each managing area. In this manner, a plurality of unit processors can be exclusively controlled with an HW semaphore.

In the embodiment, the HW semaphore unit 13 adds a common ID to at least some semaphores among the plurality of HW semaphores when it adds an ID. The HW semaphore unit 13 also sets management area to each of the plurality of HW semaphores added with a common ID. Then, the program-managing unit 105 determines whether the requested HW semaphore has been used by the other unit processor or not for each managing area as mentioned above. Accordingly, it can exclusively control the unit processors by controlling many semaphores even when the hardware resource is little.

That is to say, eight HW semaphores from the HW semaphores 0 to the HW semaphore 7 are defined so that 255 IDs can be set in the embodiment. As a result, an ID is added to each of the HW semaphores 0 to 6 and 8 to 255 IDs are associated with the HW semaphores 7. Then, a managing area corresponding to the 8 to 255 IDs is provided for, for example in the memory 30.

Each of the unit processors P0 to P3 requests to obtain a semaphore for processing a task that occurs inside the multi-processor and a handler that occurs outside the multi-processor. The interruption controlling unit 11 and the program controlling unit 105 waits or permits to obtain a semaphore between semaphore obtaining requests for processing tasks, or between a semaphore obtaining request for processing tasks and a semaphore obtaining request for processing a handler, and between semaphore obtaining requests for processing handlers.

With this configuration, the multi-processor of the embodiment can process in parallel between task processing, between task processing and processing by an external interruption and between processing by an external interruption, and exclusively control them as required.

If the HW semaphore specified by the unit processors P0 to P3 has been obtained as a semaphore-obtaining request is issued from the unit processors P0 to P3, the HW semaphore unit 13 notifies a new request that it failed in obtaining the HW semaphore specified. The HW semaphore unit 13 has a function of returning the notification of that it succeeded in obtaining the specified HW semaphore to the unit processor, if the HW semaphore has not been obtained before.

Such HW semaphore can prevent a plurality of unit processors from using the same hardware resources at the same time. For this reason, a trouble such as processing is interrupted as predetermined areas in the memory 30 used by the OS are accessed at the same time can be prevented. The processor of the embodiment includes a memory 30 that is a common area for the unit processors P0 to P3 and a memory controlling unit 12 that control the memory 30. In the embodiment, information for associating a hardware resource and an ID of the HW semaphore is kept in the memory 30.

An inner configuration of each of the unit processors P0 to P3 will be described. The unit processors P0 to P3 have the same configuration. Thus, only an inner configuration of the unit processor P0 will be described to omit description of the unit process of the other unit processors.

The unit processor P0 includes a fetch unit 101, a decoding unit 102, an ALU (Arithmetic and Logical Unit) 103, a register file 104 and a program controlling unit 105. The fetch unit 101 reads an instruction code from a memory address indicated by a program counter of the program controlling unit 105 to be described later and outputs the instruction code to the decoding unit 102.

The decoding unit 102 decodes the instruction code inputted by the fetch unit 101 and outputs the decoded result (addresses of an instruction, a source register, a destination register) to the ALU 103.

The ALU 103 performs a predetermined computation according to the decoded result inputted by the decoding unit 102, writes the computation result into the register file 104 or outputs an address of the destination of the branch that is a computation result such as a branching instruction or the like to the program controlling unit 105.

The register file 104 is a group of registers that stores data read from the memory 30 in response to the loading instruction or data that is a computation result of the ALU 103. To be described later, the register file 103 includes a group of general registers and a group of special registers. The group of special registers is an area, in which address for boot processing of the embodiment is written.

The program controlling unit 105 is for controlling over the unit processor P0 and includes a status register (PSR) 305 that stores a status of the unit processor P0 (for example, whether an interruption can be executed or not, whether overflow occurs in the unit processor P0 or not) and a program counter (PC) 230 that keeps a memory address in which an instruction to be executed by the unit processor P0 next is stored. The program controlling unit 105 changes the value of the PSR 305 to an interruption disabled when the unit processor P0 transfers to an interruption or changes the value of the program counter to an address of the branch destination when a branch instruction is executed.

When a currently executed task outputs a request to obtain the HW semaphore, the program controlling unit 105 first receives the obtained result of the HW semaphore and updates a flag indicating that it succeeded in obtaining the HW semaphore in an area showing the obtaining result of the HW semaphore in the status register. If it failed in obtaining a semaphore, the program controlling unit 105 updates a flag indicating that it failed in obtaining the HW semaphore, pauses the obtaining of the HW semaphore and exits the waiting state.

The program controlling unit 105 has an expelling prohibiting flag 106. The expelling prohibiting flag 106 is a mechanism for prohibiting a task to be expelled from the unit processor in response to occurrence of task switching or external interruption in the self-unit processing. When the expelling prohibiting flag 106 is set to 1, a task or an interruption currently in the unit processor is prohibited to be switched to another task or another interruption.

The state where expelling of a task is prohibited in the unit processor is called a lock state. In the embodiment, a lock state is realized by spin lock.

The spin lock is a way of busy wait by waiting for the resource released when the same resource is used between the unit processors (in the embodiment, hardware resources). It is advantageous in that the spin lock has less overhead for synchronization between the unit processors than an exclusive controlling using a communication between the unit processors. The spin lock is a system appropriate for the case where an excluding period for using a resource is short.

When an external interruption signal is inputted from a peripheral chip such as the wireless unit 50 or the like, the interruption controlling unit 11 arbitrates the interruption signal and outputs a predetermined interruption signal to a specified unit processor among the unit processors P0 to P3. The memory-controlling unit 12 is provided between the CPU 10 and the memory 30. When data is read or written from the CPU 10 to the memory 30, the memory-controlling unit 12 inputs/outputs data by controlling the memory 30.

Next, an operation of the above mentioned multi-processor will be described.

Figure 4:
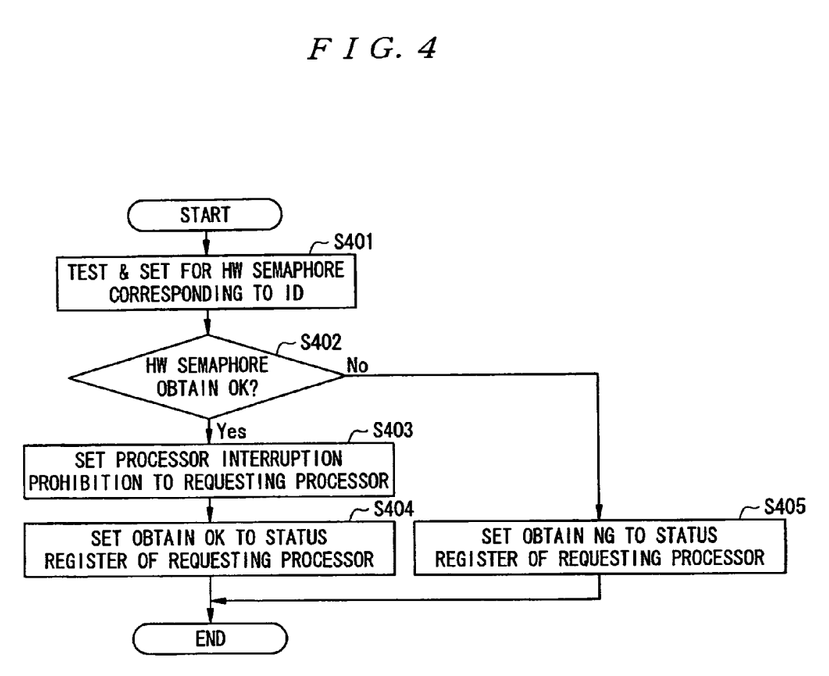
FIG. 4 is a flowchart illustrating a controlling method of an interruption of the multi-processor system of the embodiment.

FIG. 4 is a flowchart illustrating a controlling method of an interruption of the multi-processor system of the embodiment. It is a diagram for illustrating processing executed by the program controlling unit 105 and the HW semaphore unit 13 that is a hardware configuration.

When processing to be excluded occurs, the HW semaphore unit 13 accepts a request to obtain the HW semaphore by a software request at the unit processor side (S401). The HW semaphore is obtained in the TEST & SET system. The TEST & SET system is executed in response to a machine language instruction, thus, no completion occurs as another task or the like does not interrupts the processing.

The HW semaphore unit 13 determines whether it succeeded in obtaining the HW semaphore or not (S402). If it succeeded in obtaining the HW semaphore as a result of the determination (S402: Yes), the program controlling unit 105 prohibits an interruption for the unit processor (requesting processor) that obtained the HW semaphore (S403). The interruption prohibition is for prohibiting task switch by dispatch other than interruption requested from outside the multi-processor to the requesting processor or the interruption requested by the other unit processor.

The program controlling unit 105 notifies the requesting processor that it can obtain the HW semaphore by setting the fact to the status register of the requesting processor (S404). In the embodiment, if the HW semaphore is successfully obtained, the expel prohibition flag 106 of the requesting processor is set at the same time to be spin locked. If it is determined that the HW semaphore cannot be obtained at the step S402 (S402: No), it sets that the HW semaphore cannot be obtained to the status register of the requesting processor (S404).

Figure 5A:
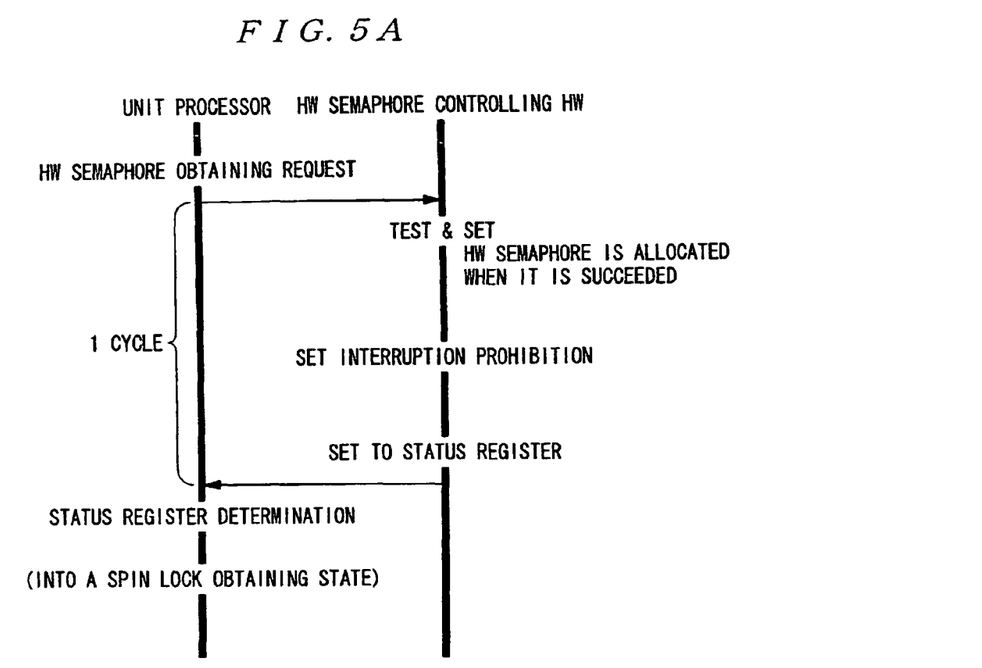
FIGS. 5A and 5B are diagrams illustrating whether the HW semaphore shown in the flowchart of FIG. 4 can be obtained or not.
Figure 5B:
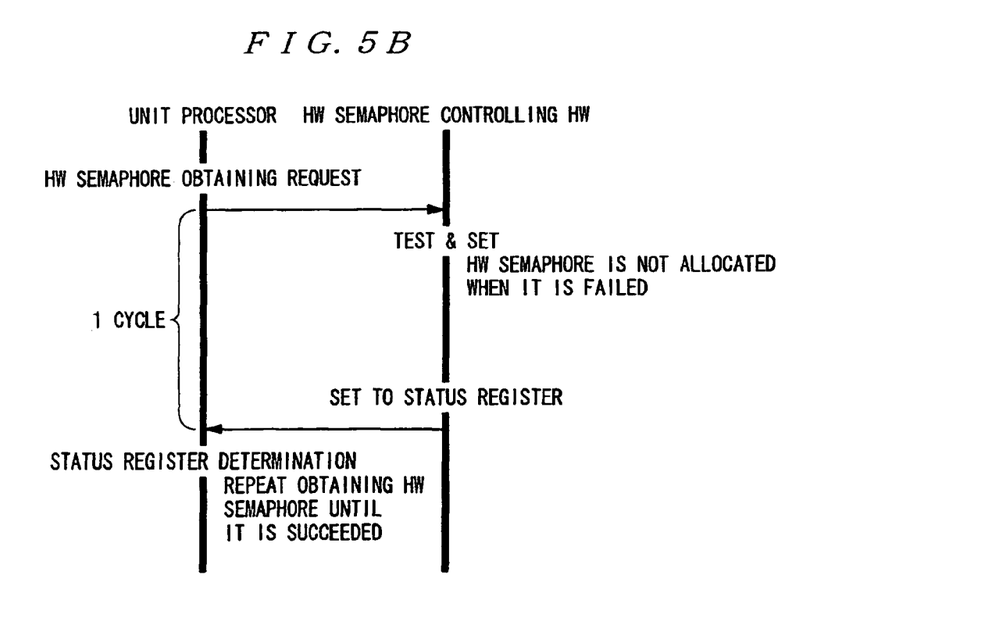

FIGS. 5A and 5B are diagrams illustrating whether the HW semaphore can be obtained or not. As shown in FIGS. 5A and 5B, the unit processor to be a requesting processor executes TEST & SET for obtaining the HW semaphore for the HW (HW semaphore unit 13) that controls the HW semaphore. Processing from execution of TEST & SET to writing the result to PSR completes by one cycle.

If the HW semaphore can be obtained, the HW semaphore unit 13 writes the PSR 305 of the requesting processor that the HW semaphore can be obtained. The requesting processor that received a notification of obtaining of the HW semaphore reserves a spin lock state. If the HW semaphore cannot be obtained, the HW semaphore unit 13 writes that the HW semaphore cannot be obtained in the PSR 305 of the requesting processor. If the HW semaphore cannot be obtained, the requesting processor repeats processing for obtaining the HW semaphore until the HW semaphore can be obtained.

Figure 6:
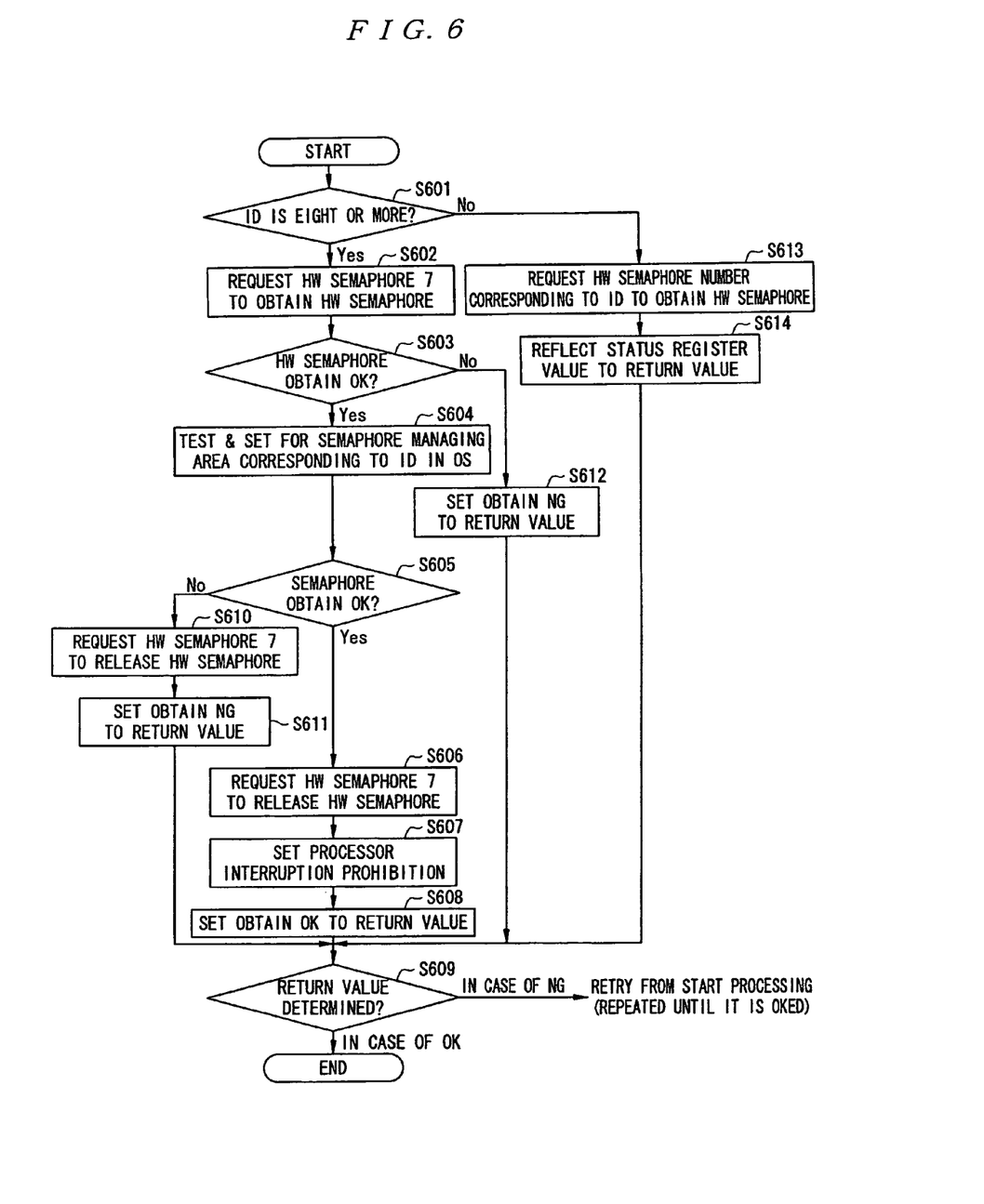
FIG. 6 is a flowchart illustrating processing for obtaining the HW semaphore executed by the program controlling unit of an embodiment of the present invention.

FIG. 6 is a flowchart illustrating processing for obtaining the HW semaphore executed by the program controlling unit 105 of the requesting processor. The requesting processor first references information corresponding to the HW semaphore and the ID kept in the memory 30 and identifies (S601) the ID of the HW semaphore that is desired to be obtained. If the ID is less than eight, the ID and the HW semaphore are associated with each other one by one. Thus, the requesting processor requests the HW semaphore unit 13 to obtain the HW semaphore corresponding to the ID (S613). Then, the requesting processor returns the result to the program by reflecting the value of PSR in which the result is written on the return value (S614).

If it is determined that ID is eight or more at the step S601 (S601: Yes), the program controlling unit 105 requests the HW semaphore 7 to obtain the HW semaphore unit (S602). If the value written in the PSR indicates that the HW semaphore has been obtained (S603: Yes), the program controlling unit 105 performs TEST & SET on the managing area of the HW semaphore corresponding to the ID (S604).

If a plurality of IDs are added to a single HW semaphore 7 in such a manner, the embodiment enables a plurality of unit processors to process a single HW at the same time by using the single HW without affecting each other.

The program controlling unit 105 determines whether a semaphore can be obtained by the TEST & SET or not (S605), and requests the HW semaphore 7 to release the HW semaphore (S606). Moreover, it sets the requesting processor (S607) to interruption prohibition to prohibit task interruption, external interruption and task switch to the self-processor. After the above mentioned processing, the program controlling unit 105 reflects the value of the PSR in which the result of obtaining of the HW semaphore is written on the return value and return the result to the program (S608).

If the program controlling unit 105 cannot obtain the HW semaphore (S612: No), it reflects the value of the PSR representing that it failed in obtaining the HW semaphore on the return value and return the result to the program (S614). If the semaphore cannot be obtained by the TEST & SET (S605: No), it requests the HW semaphore 7 to release the HW semaphore, then reflects the value of the PSR on the return value and return the result to the program (S611).

In the embodiment, four service calls below are set to perform the above mentioned processing.

loc_spn

This is a service call for obtaining an HW semaphore from the task side. The unit processor does not recover from the service call until it can obtain the HW semaphore. If the unit processor that processes a task is in the loc_spn state, the service calls other than unl_spn are prohibited and interruption and task switch to the unit processor are also prohibited.

iloc_spn

This is a service call for obtaining HW semaphore from the interruption handler side. The unit processor does not recover from the service call until it can obtain the HW semaphore. If the unit processor that performs the interruption handler is in the iloc_spn state, the service calls other than iunl_spn are prohibited and interruption and task switch to the unit processor are also prohibited.

unl_spn

This is a service call for releasing HW semaphore from the task side. If there is a unit processor that waits for obtaining HW semaphore, the unit processor can obtain a spin lock at a timing of unl_spn.

iunl_spn

This is a service call for releasing HW semaphore from a interruption handler side. If there is a unit processor that waits for obtaining an HW semaphore, the unit processor can obtain a spin lock at a timing of iunl_spn.

Figure 7A:
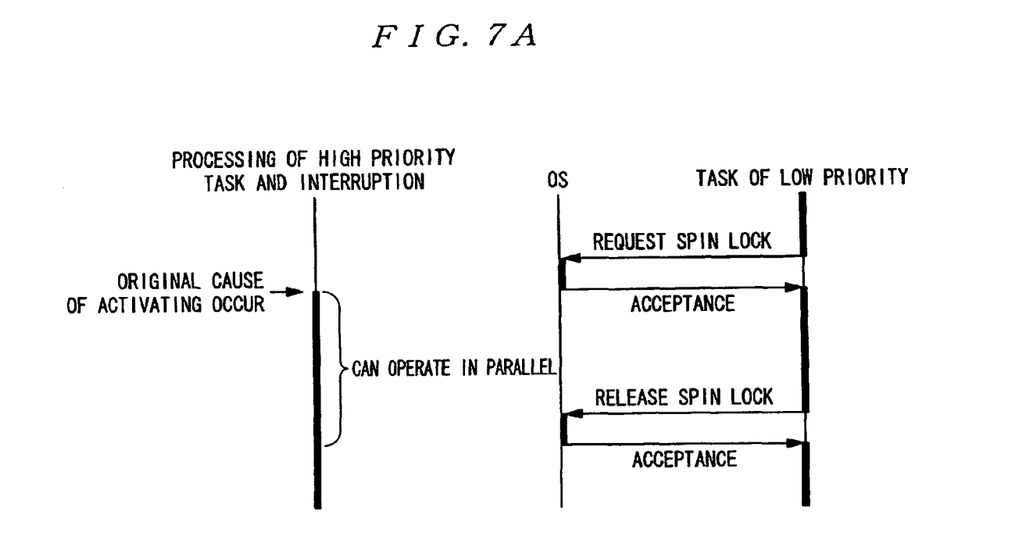
FIGS. 7A and 7B are diagrams illustrating a parallel operation implemented according to the flowchart shown in FIG. 6.

FIGS. 7A and 7B are diagrams illustrating a parallel operation implemented according to the flowchart shown in FIG. 6. As shown in FIG. 7A, the embodiment is spin locked by an OS until the unit processor that performs the task ends the task while it is executing a task whose priority is relatively low. During the processing, a task or an interruption that is executed without regard of the HW semaphore obtained by the task being executed can operate in parallel in the other unit processors without the multi-processor of the embodiment being set to interruption prohibition.

Figure 7B:
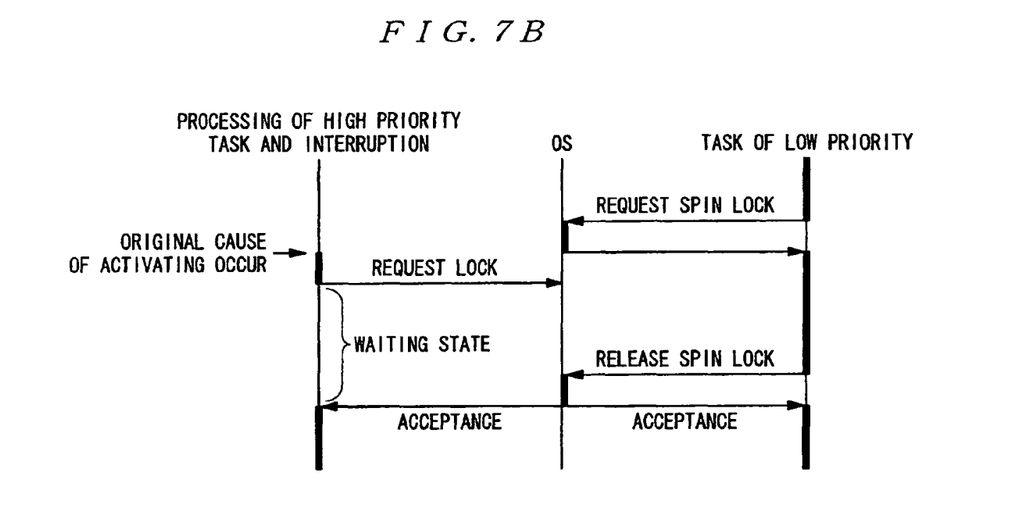

As shown in FIG. 7B, if a unit processor operating in parallel requests to obtain an HW semaphore for which a task processed in parallel or an interruption has been obtained, the tasks and the like will wait until the requested HW semaphore is released.

Figure 8:
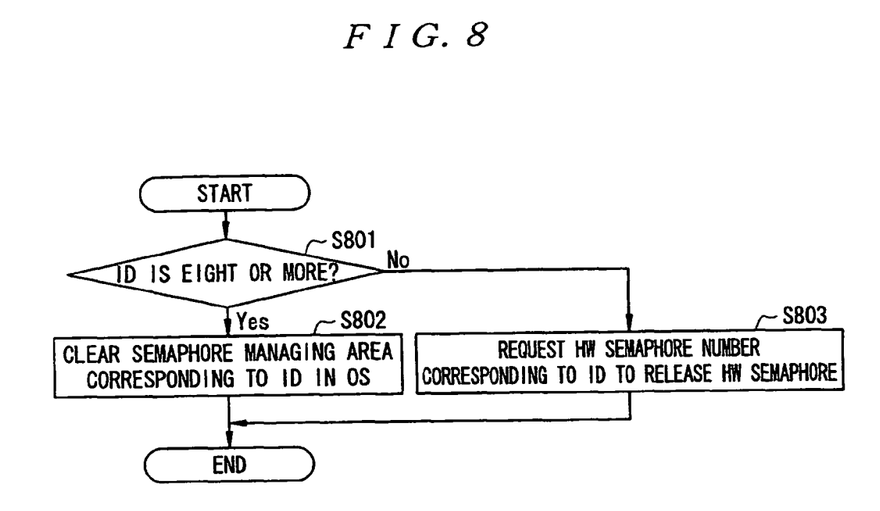
FIG. 8 is a flowchart illustrating processing for the program controlling unit of the embodiment of the present invention to release the HW semaphore.

FIG. 8 is a flowchart illustrating processing for the program controlling unit 105 to release the HW semaphore. The program controlling unit 105 determines whether the ID of the HW semaphore to be released is eight or more or not (S801). If the ID is less than eight as a result of the determination (S801: No), the program controlling unit 105 requests the HW semaphore unit 13 to release the HW semaphore corresponding to the ID (S803).

If the ID is eight or more (S801: Yes), the program controlling unit 105 clears the information written in the semaphore managing area corresponding to the ID in the OS (S802) and ends the processing.

Figure 9:
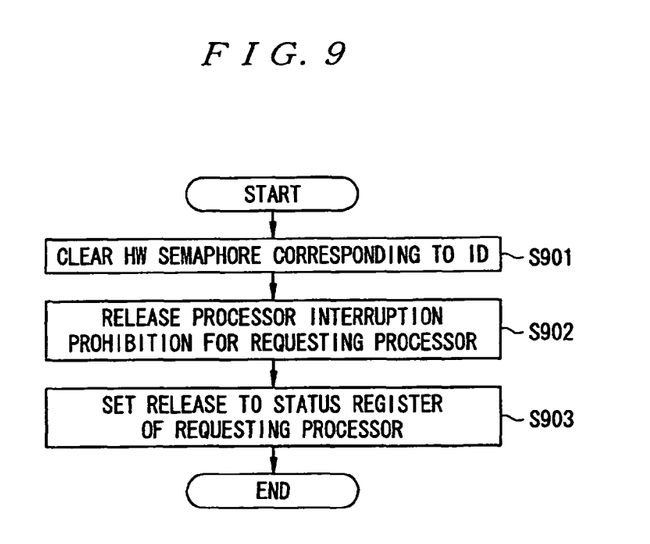
FIG. 9 is a flowchart illustrating processing for the HW semaphore unit 13 of the embodiment of the present invention to release the HW semaphore.

FIG. 9 is a flowchart illustrating processing for the HW semaphore unit 13 to release the HW semaphore. The HW semaphore unit 13 issues a releasing request (CLEAR) to the HW semaphore with the ID to be released (S901).

Then, the HW semaphore unit 13 releases the interruption prohibition to the requesting processor (S902), sets and notifies a value indicating that it released the HW semaphore to the PSR 305 of the requesting processor (S903).

Figure 10:
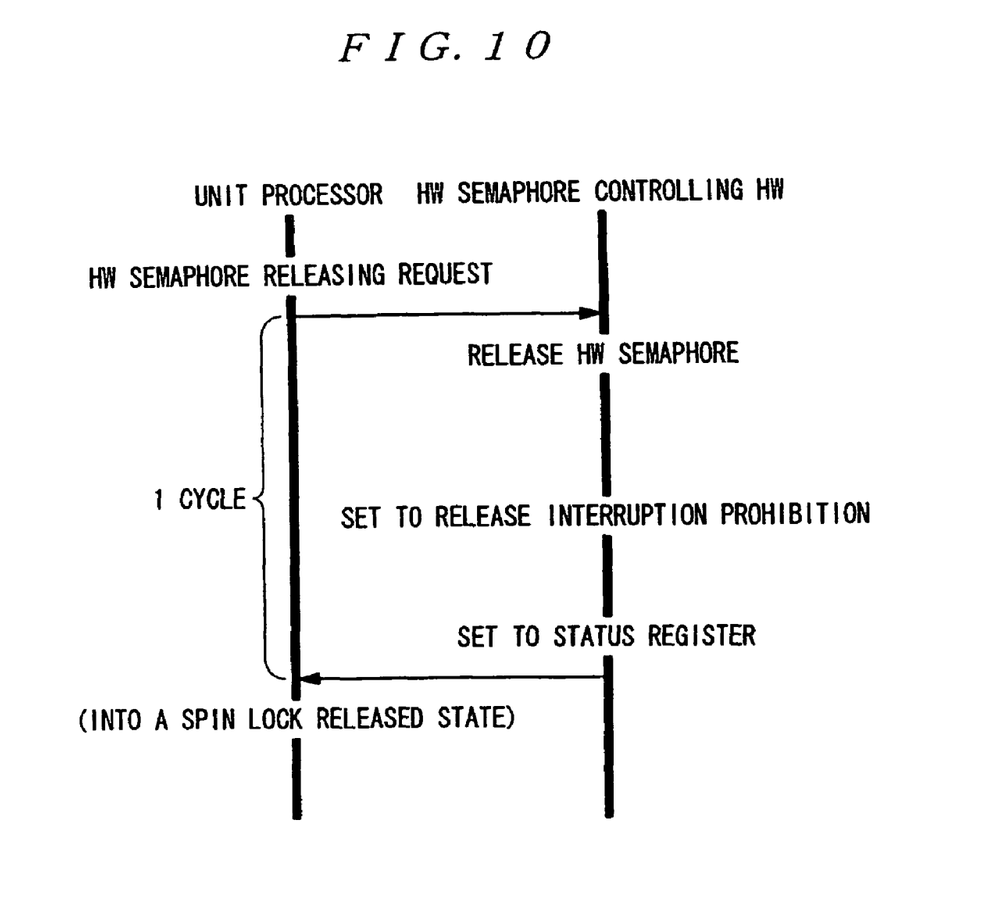
FIG. 10 is a diagram illustrating releasing of the HW semaphore of an embodiment of the present invention.

FIG. 10 is a diagram illustrating releasing of the HW semaphore. The unit processor to be a processor, which requests to release the HW semaphore, is released from the spin lock state after it received the notification of releasing the HW semaphore.

The program for causing a computer to execute a controlling method of an interruption of the multi-processor system of the embodiment mentioned with reference to FIGS. 4, 6, 8, and 9 is provided on a computer readable storage medium such as a CD-ROM, a floppy (registered trademark) disk (FD), a DVD or the like in a file in an installable form or an executable form. The program for causing a computer to execute the controlling method of an interruption of the multi-processor system of the embodiment may be stored on a computer connected to a network such as the Internet and provided by being downloaded over the network.

The program for causing a computer to execute the controlling method of an interruption of the multi-processor system of the embodiment mentioned above may be provided as it is recorded on a memory device such as a computer readable ROM, a flash memory, a memory card, a USB connected flash memory or the like.

According to the embodiment mentioned above, eight HW semaphores are set to be identified, and the HW semaphore corresponding to the HW resource to be used by the task processing or interruption handler is specified as it is requested to be obtained. As such, tasks or interruptions which do not compete can be operated in parallel.

If the HW semaphore which has been previously obtained is requested to be obtained, the requesting unit processor is made to wait until the processing ends. As such, the same HW resource is not used in the parallel processing so that deadlock or the like due to competing of the processing can be prevented.

It is apparent that the multi-processor system and the controlling method of an interruption of the multi-processor system of the embodiment gives a shorter period of time for a task or the like to wait than in the conventional configuration previously shown in FIG. 11. Thus, the embodiment can shorten a waiting time and improve the efficiency of the parallel processing.

What is claimed is:

1. A multi-processor system with a plurality of unit processors, comprising:
    a semaphore setting section for setting a semaphore representing a preferential right to competing of each of a plurality of resources;
    a semaphore request determining section for determining, when a first unit processor among said plurality of unit processors requests to obtain the semaphore set by said semaphore setting section, whether the request is for requesting the semaphore obtained by a second unit processor; and
    an exclusive controlling section for making the request by the first unit processor wait when the semaphore request determining section determines that said request is for requesting the semaphore obtained by the second unit processor, and for permitting the requested semaphore to be obtained when the semaphore request determining section determines that said request is for requesting a semaphore other than the semaphore obtained by any of the plurality of unit processors,
    wherein the semaphore setting section assigns identification information to each of a plurality of semaphores to identify each of the plurality of semaphores, assigns a plurality of the resources to at least one of the plurality of semaphores, and sets an area in a shared memory for each of the plurality of semaphores to manage the plurality of semaphores, and
    wherein the semaphore request determining section determines whether or not the semaphore requested by the first unit processor is the semaphore obtained by the second unit processor based on the area in the shared memory.

2. The multi-processor system according to claim 1, comprising
    an interruption prohibiting section for prohibiting at least one of a task switch by dispatch for the first unit processor that is permitted to obtain the semaphore, an interruption requested from outside and an interruption requested by another unit processor.

3. The multi-processor system according to claim 1, wherein
    a unit processor requests to obtain a semaphore to process a task which occurs inside the multi-processor system and a handler which occurs outside the multi-processor system, and said exclusive controlling section causes to wait or permits to obtain a semaphore between semaphore obtaining requests for processing tasks, between a semaphore obtaining request for processing a task and a semaphore obtaining request for processing a handler, and between semaphore obtaining requests for processing handlers.

4. The multi-processor system according to claim 1, wherein
    said first processor is spin-locked when said exclusive controlling means permits to obtain the semaphore requested by said first unit processor.

5. A program for causing a computer to execute a controlling method of an interruption of a multi-processor system to be applied to the multi-processor system with a plurality of unit processors, comprising:
    setting a semaphore representing a preferential right to competing of each of a plurality of resources;
    determining, when a first unit processor among said plurality of unit processors requests to obtain a semaphore to be identifiable, whether the request is for requesting the semaphore obtained by a second unit processor; and
    making the request from the first unit processor wait when it is determined in the determining that said request is for requesting the semaphore obtained by the second unit processor, and for permitting the requested semaphore to be obtained when it is determined in the determining that said request is for requesting a semaphore other than the semaphore obtained by any of the plurality of unit processors;
    wherein the setting assigns identification information to each of a plurality of semaphores to identify each of the plurality of semaphores, assigns a plurality of the resources to at least one of the plurality of semaphores, and sets an area in a shared memory for each of the plurality of semaphores to manage the plurality of semaphores, and
    wherein the determining determines whether or not the semaphore requested by the first unit processor is the semaphore obtained by the second unit processor based on the area in the shared memory.

* * * * *